(No Model.)

A. KUHNE.
GAS REGULATOR.

No. 605,168. Patented June 7, 1898.

WITNESSES:
Frank Weyl
James Skinner

INVENTOR
Adolph Kuhne
BY
Alfred Tschinkele
ATTORNEY.

UNITED STATES PATENT OFFICE.

ADOLPH KUHNE, OF NEW YORK, N. Y., ASSIGNOR OF ONE-HALF TO JAMES C. MEEKS, OF SAME PLACE.

GAS-REGULATOR.

SPECIFICATION forming part of Letters Patent No. 605,168, dated June 7, 1898.

Application filed July 15, 1897. Serial No. 644,627. (No model.)

*To all whom it may concern:*

Be it known that I, ADOLPH KUHNE, of New York, N. Y., have invented a certain new and useful Improvement in Gas-Regulators, of which the following is a specification.

This invention appertains to a form of regulator suitable for attachment to a meter or elsewhere and designed to effect an economy in gas consumption and the attainment of a brighter and more uniform light when the gas is used as an illuminant.

Figure 1:
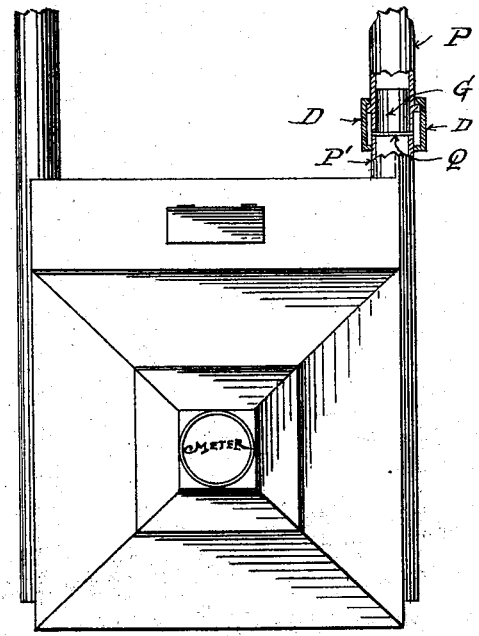
Figure 2:
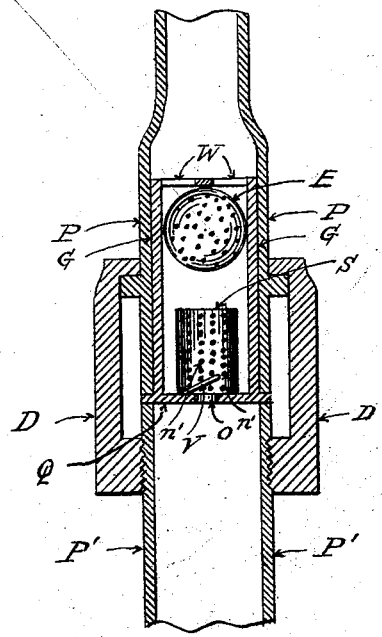
Figure 3:
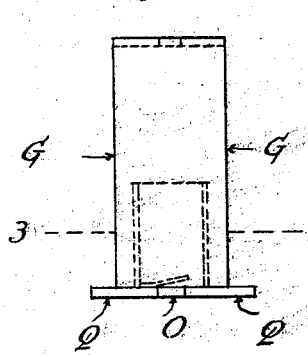
Figure 4:
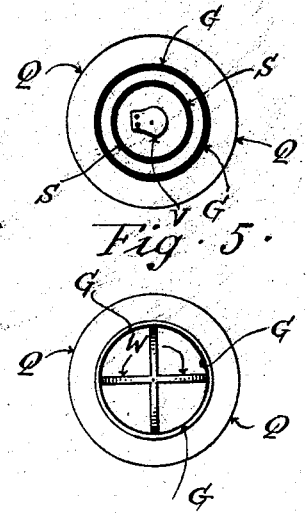
Figure 5:
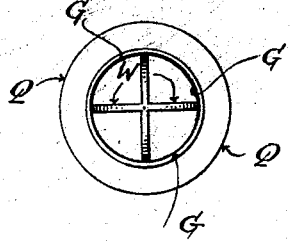
Figure 6:
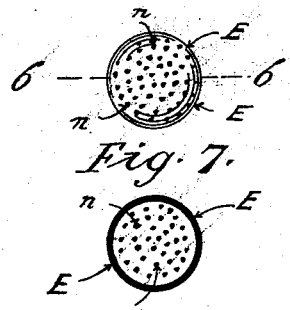
Figure 7:

In the accompanying drawings, which set forth a regulator embodying my improvement, Figure 1 shows the device as applied to a gas-meter outlet-pipe. Fig. 2 is a longitudinal section of the device. Fig. 3 is an elevation of a portion of the device. Fig. 4 is a cross-section on the line 3 3, Fig. 3. Fig. 5 is a top view of Fig. 3. Fig. 6 is a view of a hollow perforated ball comprised in the improvement. Fig. 7 is a section on the line 6 6, Fig. 6.

Similar letters of reference designate corresponding parts in all figures.

The abutting ends P P' of the gas-outlet pipe are secured together by any appropriate means—for instance, by a coupling-sleeve D, which bears against a collar upon the pipe P and engages by a screw-thread upon the pipe P'. For the purpose of making the conditions uniform when the meter is tested in comparison with a test-meter the opening through the outlet-pipe may be closed by a perforated plate Q, the opening $o$ in which is of the same area as the cross-section of the outlet-pipe on the test-meter. To preserve some slight degree of back pressure, the opening $o$ is closed by a valve V, opening upward or in the direction of flow of the gas.

G is a shell fitted to the interior of the pipe P. It may be formed integral with the plate Q or fixedly secured thereto.

Freely movable within the interior of the cylindrical shell G is a hollow ball E, formed of perforated material and designed to freely move lengthwise of the shell G as well as revolve therein. At the upper extremity of this shell G are cross-wires W W, which prevent the ball from passing out of the shell entirely. An interior concentric shell S, also perforated, extends upward a short distance from the upper surface of the plate Q, thus preventing any interference by the ball E with the operation of the valve V, the ball resting upon the upper edge of the shell S when the former is at its lowest point. This shell S is not only open at its top, but is plentifully supplied with perforations $n'$ $n'$ as well.

The operation and purposes of the device may be readily appreciated. Gas passing upward from the meter issues through the opening $o$, and if of sufficient pressure raises the ball E an amount dependent upon the pressure of the gas. During the passage of the gas the ball is constantly turning, as a result securing a uniform and thorough incorporation and mixture of the gas ingredients. A brighter and more satisfactory light will be attained, accompanied by an economy in the consumption.

Having described my invention, what I consider as new, and desire to secure by Letters Patent, is—

1. In a gas-regulator, the combination with a tubular shell, of a hollow, perforated ball freely movable both rotarily and lengthwise therein, substantially as specified.

2. In a gas-regulator, the combination of an outer shell, an inner concentric perforated shell, and a ball movable freely in the former shell, substantially as specified.

3. In a gas-regulator, the combination of an outer shell, an inner concentric perforated shell, and a hollow perforated ball, substantially as specified.

4. In a gas-regulator, the combination of an outer shell, an inner concentric perforated shell, a hollow perforated ball, and a valve situated at the bottom of said inner shell, substantially as specified.

In testimony whereof I have signed this specification in the presence of two subscribing witnesses.

ADOLPH KUHNE.

Witnesses:
FRANK WEYE,
JAMES SKINNER.